US012767066B2

(12) United States Patent
Stietenroth et al.

(10) Patent No.: US 12,767,066 B2
(45) Date of Patent: Oct. 20, 2026

(54) BACKLIT VEHICLE TRIM-PART, IN PARTICULAR VEHICLE BADGE

(71) Applicant: DEMMEL AG, Scheidegg (DE)

(72) Inventors: Marek Stietenroth, Scheidegg (DE); Mathias Stadelmann, Lindenberg (DE); Hans Peter Pircher, Lindau (DE)

(73) Assignee: Demmel AG, Scheidegg (DE)

( * ) Notice: Subject to any disclaimer, the term of this patent is extended or adjusted under 35 U.S.C. 154(b) by 35 days.

(21) Appl. No.: 18/724,768

(22) PCT Filed: Dec. 28, 2022

(86) PCT No.: PCT/EP2022/087941
§ 371 (c)(1),
(2) Date: Jun. 27, 2024

(87) PCT Pub. No.: WO2023/126432
PCT Pub. Date: Jul. 6, 2023

(65) Prior Publication Data

US 2025/0065820 A1 Feb. 27, 2025

(30) Foreign Application Priority Data

Dec. 29, 2021 (DE) ..................... 10 2021 006 465.8

(51) Int. Cl.
*B60R 13/00* (2006.01)
*G09F 13/04* (2006.01)
*G09F 13/08* (2006.01)

(52) U.S. Cl.
CPC ........ *B60R 13/005* (2013.01); *G09F 13/0404* (2013.01); *G09F 13/044* (2021.05); *G09F 13/08* (2013.01)

(58) Field of Classification Search
CPC ..... G09F 2007/1865; G09F 2007/1882; G09F 13/044; B60R 13/005
See application file for complete search history.

(56) References Cited

U.S. PATENT DOCUMENTS 4,977,695 A * 12/1990 Armbruster ........... B60R 13/005 40/556
5,736,233 A * 4/1998 Fye ......................... G09F 13/08 428/206

(Continued)

FOREIGN PATENT DOCUMENTS

DE 102008057332 A1 5/2010
DE 202013102543 U1 6/2013

(Continued)

OTHER PUBLICATIONS

Kameoka, Decorative Member and Decoration Method, Jul. 4, 2019, JP 2019107921A (Year: 2019).*

*Primary Examiner* — Jong-Suk (James) Lee
*Assistant Examiner* — James M Endo
(74) *Attorney, Agent, or Firm* — FisherBroyles, LLP; Roger L. Browdy; Ronni S. Jillions

(57) ABSTRACT

A backlit vehicle-trim part, in particular a vehicle badge, including a three-dimensionally shaped film-like visible part made of plastic, which can be at least partially transilluminated and the visible side of which forms the externally visible trim part or vehicle badge, and a light housing, which is arranged on the rear side of the visible part, contains one or more light elements and is connected to the visible part, wherein the film-like visible part is connected to the light housing in an in-mold back-molding operation.

10 Claims, 4 Drawing Sheets

(56) References Cited

U.S. PATENT DOCUMENTS

| | | | | | |
|---|---|---|---|---|---|
| 5,806,957 | A * | 9/1998 | Prior | G09F 21/04<br>362/267 |
| 6,092,915 | A * | 7/2000 | Rensch | B60Q 3/78<br>362/311.03 |
| 11,427,137 | B2 | 8/2022 | Studeny et al. | |
| 2006/0245190 | A1 * | 11/2006 | Thompson | G02B 6/0001<br>362/222 |
| 2014/0119038 | A1 * | 5/2014 | Mulder | H01L 21/76224<br>362/311.03 |
| 2015/0356895 | A1 * | 12/2015 | Boppart | G09F 13/04<br>362/546 |
| 2017/0101047 | A1 * | 4/2017 | Dellock | F21K 9/64 |
| 2017/0200403 | A1 * | 7/2017 | Salter | B60R 13/005 |
| 2017/0355302 | A1 * | 12/2017 | Kuramitsu | G02B 6/002 |
| 2018/0194277 | A1 * | 7/2018 | Lobo | B60R 13/005 |
| 2019/0031090 | A1 * | 1/2019 | Stossel | B60Q 3/64 |
| 2020/0375040 | A1 * | 11/2020 | Cai | G06F 1/1637 |
| 2021/0122302 | A1 | 4/2021 | Mcclelland | |
| 2021/0387570 | A1 * | 12/2021 | Piles Guillem | B44C 5/04 |

FOREIGN PATENT DOCUMENTS

| | | | | | |
|---|---|---|---|---|---|
| DE | 102012003412 | A1 | | 8/2013 | |
| DE | 202017101348 | U1 | | 4/2017 | |
| DE | 202017005143 | U1 | | 11/2017 | |
| DE | 102017005656 | A1 | | 2/2018 | |
| DE | 102017125113 | A1 | | 5/2019 | |
| DE | 102018220997 | A1 | | 6/2020 | |
| DE | 102020119544 | A1 | | 2/2021 | |
| EP | 1688308 | A2 | | 8/2006 | |
| EP | 3778195 | A1 | | 2/2021 | |
| EP | 3917109 | A1 | | 12/2021 | |
| JP | 2019107921 | A | * | 7/2019 | F21S 41/37 |
| WO | 2011103692 | A1 | | 9/2011 | |

* cited by examiner

BACKLIT VEHICLE TRIM-PART, IN PARTICULAR VEHICLE BADGE

The invention relates to a backlit vehicle trim part, in particular a vehicle badge. For the sake of a simpler description, only a backlit vehicle badge is described in the following description, even though the invention relates to all exterior vehicle trim parts with back-lighting.

When it comes to the configuration of vehicle badges on land vehicles, watercraft and aircraft, it is known thus far to produce the vehicle badge from a metal material, preferably aluminum, and to implement the colored surfaces used for decoration as colored varnish coats on the visible side. Due to their surface varnishing, such metallic badges are characterized by a brilliant color scheme and, due to their metal property, achieve a chrome trim part effect that is adapted to the remaining trim parts of the vehicle.

To ensure back-lighting, it is furthermore known for such metallic badges to create the translucent surfaces by machining of the badge. Such prior art can be derived from DE 10 2017 125 113 A1 attributable to the same applicant.

However, the manufacture of such genuine metal decorative panels necessitated complex machining. In the process, it was found that the weather resistance of such varnished badges is insufficient. Endeavors are therefore being made to produce such backlit metallic vehicle badges and/or trim parts from weather-resistant plastic compounds.

Such designs are known from DE 20 2017 101 348 U1, DE 20 2017 005 143 U1, DE 20 2013 102 543 U1, and DE 10 2020 119 544 A1.

DE 10 2017 005 656 A1 also describes a badge assembly comprising a light guide.

However, it is the object of the invention to reproduce the color effect of the varnished metal badges and/or trim parts as naturally as possible when developing badges and/or trim parts made of plastic, to additionally achieve the treasured chrome trim part effect, and moreover to achieve better weather resistance.

A first approach for achieving the above-described objects became known from EP 3 917 109 A1.

In this known assembly, a vehicle-typical vehicle badge in the form of a thermoformed plastic part is embedded between two lenses arranged at a distance from one another, which results in a special light distribution when backlit. The drawback of this assembly is the relatively complex production process and the absent or only limited stability since no stable support is provided by the relatively thin deformed films which would protect the entire structure against deformations. However, a brilliant color rendering and a chrome trim part effect are not achieved by this design.

Another illuminated vehicle badge became known from US 2021/0122302 A1, in which a light-emitting structure having individual LEDs arranged in certain spots is present in the base body, with a light-distributing structure in the form of a flat disk being arranged above the LEDS, wherein the light-emitting structure is covered by an upper, covering lens structure.

Drawbacks here are also that a complex production process must be tolerated, the individual layers are insufficiently sealed with respect to one another, and the mechanical bond of the layers is insufficient.

It is therefore the object of the invention to refine an illuminated plastic vehicle trim part, in particular an illuminated vehicle badge of the type mentioned at the outset, in such a way that high weather resistance, a brilliant color rendering and a chrome trim part effect can be achieved along with a simpler structure.

To achieve the stated object, the invention is characterized by the technical teaching of the independent claim, in which a backlit vehicle trim part, in particular a vehicle badge, comprises a three-dimensionally shaped film-like visible part made of plastic, which can be at least partially transilluminated and the visible side of which forms the externally visible trim part or vehicle badge, and a light housing, which is arranged on the rear side of the visible part, contains one or a plurality of light elements and is joined to the visible part, wherein the film-like visible part is made of plastic and is joined on the rear side to the light housing using an in-mold back-molding operation, and three-dimensional deformations, in the form of convex embossings, are integrally formed in the film-like visible part.

By way of the preferred features of the technical teaching of the independent claim, a stable, warp-free bond with the light housing is created for the vehicle badge and/or the trim part through the use of an in-mold method, with the bond being able to withstand greater mechanical lateral forces, not warping or deforming under the action of heat and, compared to varnished decorative panels, offering superior weather resistance while simultaneously achieving a brilliant color rendering and a chrome trim part effect.

The preferred feature of invention is that a three-dimensional film-like visible part is present, which preferably has a thickness in the range between 0.3 to 0.5 mm, wherein the three-dimensional film designed as the visible part or as a vehicle-typical badge can be at least partially transilluminated, is printed on both sides, or at least on one side, and is joined in one piece from a single material, on the rear side thereof, to a light housing (this being a light-emitting housing) with the aid of the in-mold method. The light housing is molded onto the rear side of the visible part in the process.

The in-mold method (also in-mold method or back-molding) is preferably used in the process and is primarily employed during injection molding, but also during thermoforming for in-mold labeling. The film-like three-dimensionally deformed visible part is inserted into the thermoforming mold or injection mold, and what later forms the light housing is injected into the mold in the form of liquid plastic and directly integrally molded onto the rear side of the visible part by back-molding. This can preferably be accomplished with the aid of adhesion promoters. In this way, an exterior vehicle trim part is created in one work step as a bonded material having a superior surface.

The result is a complete union and a very stable structure of the backlit exterior vehicle trim part.

The term “visible part” shall be understood to mean the plastic surface, visible from the visible side of the trim part or badge, of a three-dimensionally deformed plastic film that is decorated in color and backlit, the visible surface of which can additionally be covered by a transparent top coat.

As a result of a back-molding operation carried out in a plastic injection mold, a warp-free, stable light housing is molded onto the rear side of the three-dimensionally deformed film of the visible part, which is inserted into the injection mold.

As a result of this back-molding, a particularly warp-free, stable structure of a vehicle badge or trim part which is protected against lateral forces is achieved. In the prior art, only unstable layer structures that were protected little against lateral displacement forces were available, while in the present invention the rear side of a relatively thin, three-dimensionally deformed film is joined to a light housing in an injection molding operation, whereby a particularly firm and warp-free bond results for the badge or trim part formed thereof.

As a result of back-molding the three-dimensionally deformed film, which is referred to as the visible part, with a stable light housing made of plastic, the advantage of a warp-free bond and a particularly simple structure exists since a plurality of different light-emitting elements (single-colored or multi-colored LEDs or passive light-guiding structures or actively shining light guides) can be arranged in the interior of the light housing.

For this purpose, it is preferred when the light housing is open on the bottom side and can preferably only be joined to a housing bottom via a sealed detent connection, so that it is possible to arrange a plurality of different light-emitting structures in the interior of the light housing.

According to a first specific embodiment, the light-emitting structure is made of an electronic circuit board on which a plurality of LEDs are arranged, the light emission of which can additionally be modified by a diffusing lens arranged thereabove and can furthermore also be distributed by a diffusing foil arranged thereabove.

Another advantage is that passive light-guiding structures can also be introduced in the top side or cover surface of the light housing which is molded onto the rear side of the film-like visible part, which was previously not readily possible.

In this way, the light-guiding structures are also protected against damage since they are joined directly in one piece from a single material to the bottom side of the film-like visible part during the back-molding operation.

When the films of the film-like visible part are being formed, it is particularly preferred when this film-like visible part emulates a metallic vehicle badge, so that it is not possible to discern visually from the outside that this is a metallic vehicle badge or a three-dimensionally deformed film visible part made of plastic, which is back-molded with the described light housing. According to the invention, the treasured advantages of the metallic badges and trim parts (brilliant color rendering, chrome trim part effect and back-lighting effect) along with optimal weather resistance are achieved by this embodiment. In addition, a more cost-effective production is possible.

It is preferred in one specific embodiment when the film visible part is designed as a multi-layer colored film.

In a particularly preferred embodiment, a translucent filter film from the Japanese company Toray bearing the trade name Picasus® is used, which is described in EP 3 778 195 A1 in another context. A manufacturing method is employed in the process, in which several decorative films are integrated in a thermoforming process into a surface of a porous body, preferably a body made of glass fibers interlocked with one another. Back-lighting is not described there.

The film described there as the decorative film forms a filter effect for the light passing through on the visible side. The invention utilizes this effect for a backlit trim part or vehicle badge.

It was found that, corresponding to the deformation of the film bond at the sites affected by the deformation, when back-lighting of the film is absent, a chrome trim part effect is created, which disappears as soon as the regions of the film that generate this chrome trim part effect are backlit. The regions generating the (silver) chrome trim part effect thus become transparent as a result of the back-lighting so that the light passes through and is easily discernible from the visible side. Such an effect was not yet previously utilized for backlit trim parts.

The regions of such a multi-layer film which generate the chrome trim part effect are preferably designed as embossings. These are features that are convexly upwardly directed out of the plane of the film body, which represent, for example, a circle, a star, a triangle or a logo of a vehicle manufacturer. These embossed regions form the chrome trim part effect in the non-illuminated state and become transparent when backlit and allow light from the light housing arranged therebeneath to pass through.

The film thus has the advantage that the silver color impression of a chrome trim part effect is present when the film is not illuminated and becomes transparent as soon as the film is illuminated from behind.

In this way, a light-emitting vehicle badge or trim part made of plastic is ideally emulated, which previously, according to the prior art, was made of a metal material, preferably aluminum, in which the light-emitting surfaces had to be milled out in a complex machining process so as to configure the light-emitting surfaces so thin that light was able to pass through. The use of a back-molded, three-dimensionally deformed film visible part yields the advantage that the colored surfaces generating the brilliant color impression can be arranged on the rear side of the visible part, whereby they are protected against weather conditions.

In some applications, it is also possible to apply such colored surfaces to the front side. In this case, weather protection by way of a top coat is still required.

It is preferred when the top side of the film-like visible part also bears a print layer, which is at least partially transparent and translucent or may also be colored.

As a result of the arrangement and design of this print layer, it is possible to emulate the darker parts of the vehicle badge, for example, to form black, non-translucent surfaces, or also colored surfaces which, for example, enable a blue or white color impression.

It is furthermore preferred in this specific embodiment when the bottom side or inner side of this film-like visible part is coated with an adhesion promoter, which forms adhesive surfaces present in some regions that, however, to not cover the light-emitting embossings. In this way, improved adhesion to the cover surface of the molded-on light housing is achieved.

It is also added that debossings or a combination of embossings and debossings may be present in all specific embodiments of the film-like visible part, in addition to the previously described embossings. This means that embossed structures can either convexly protrude from the surface of the film-like visible part or concavely recede into the structure of the visible part, so as to create regions that are visually separated from the other regions that, for example, are sealed by way of the print layer.

With this, it is achieved that the embossings become transparent and shine with the light irradiation generated by the light housing, while the regions covered by the print layer generate a different color impression under the action of light, or are completely opaque, and thus appear in an opaque and/or possibly colored or black manner even under the action of light. They may also have a translucent design.

In a second specific embodiment, it is preferred when the three-dimensionally deformed visible part is likewise designed with embossings and/or debossings, wherein, however, the outer print layer is absent.

Instead, the print layer is arranged on the inner side, which, however, serves the same purpose as the outer print layer described based on the above-described exemplary embodiment.

The above-described multi-layer filter film can be dispensed with since instead the three-dimensionally deformed film-like visible part is only embodied as a transparent film having embossings and/or debossings. The chrome trim part effect previously generated by a filter effect in the non-illuminated film is generated by other measures in the following exemplary embodiment.

It is preferred when the print layer is arranged on the inner side of the visible part so as to ensure that the print layer is protected against damage or discoloration, and it is furthermore preferred when the print layer is covered on the bottom side by a PVD print layer which generates the desired chrome trim part effect.

Such a PVD coating is preferably a layer made of aluminum, wherein aluminum molecules are sprayed or vapor deposited onto the rear side of the print layer in a sputtering operation so as to thereby form the silver regions generating the chrome part trim effect on the rear side of the print layer. These silver regions are then easily discernible from the visible side of the film since the print layer allows light to pass, or is translucent, in these regions. The regions onto which aluminum or a comparable silver material is sputtered or vapor-deposited are preferably provided in the region of the embossings and/or debossings. The structures formed thereby can form a vehicle logo, for example, so that these regions yield the desired chrome trim part effect when back-lighting is absent, and are translucent when backlit.

In a first specific embodiment, it is preferred when the light-emitting structure in the light housing is provided by an electronic circuit board having LEDs arranged thereon, wherein optionally a diffusing lens and furthermore, if necessary, a diffusing foil can be arranged above these LEDS.

In another embodiment of the invention, in contrast, it may be provided that the light-emitting LED circuit board is dispensed with, and that a light-emitting fiber structure is guided into the interior of the light housing, which in a preferred exemplary embodiment is made of a glass or plastic fiber bundle, the light-emitting side of which protrudes into the interior of the light housing, and the light impression arising there can be distributed by diffusing lenses and diffusing foils optionally arranged there. The light-generating element is arranged outside the light housing in this case.

In these specific embodiments of the light housing, it is particularly advantageous when the light-emitting top side is provided with additional light-guiding structures since these light-guiding structures are directly molded onto the rear side of the film-like visible part during the back-molding operation, whereby these structures are protected against damage or warpage, and a particularly stable structure is obtained.

Of course, such light-guiding structures can also be dispensed with.

The subject matter of the present invention can be derived not only from the subject matter of the individual claims, but also from the combination of the individual claims with one another.

All information and features disclosed in the documents, including the abstract, and in particular the spatial configuration shown in the drawings, could be claimed as being essential to the invention, provided these are novel over the prior art, either individually or in combination. The use of the terms "essential" or "according to the invention" or "essential to the invention" is subjective and does not imply that the features described in this way necessarily have to be an integral part of one or more claims.

The invention will be described in greater detail hereafter based on drawings showing only one way to carry out the invention. Additional features that are essential to the invention and advantages of the invention can be derived from the drawings and their description.

IN THE DRAWINGS

Even though the drawings show a vehicle badge 1, the invention is not limited thereto. The invention generally refers to backlit vehicle trim parts, wherein each of the exemplary embodiments according to FIGS. 1 to 9 only shows one aspect of the invention since such a round and rotation-symmetrically designed badge 1 can also be designed as an elongated vehicle trim part taking on any shape. It can preferably be an illuminated door sill plate or the like.

Figure 1:
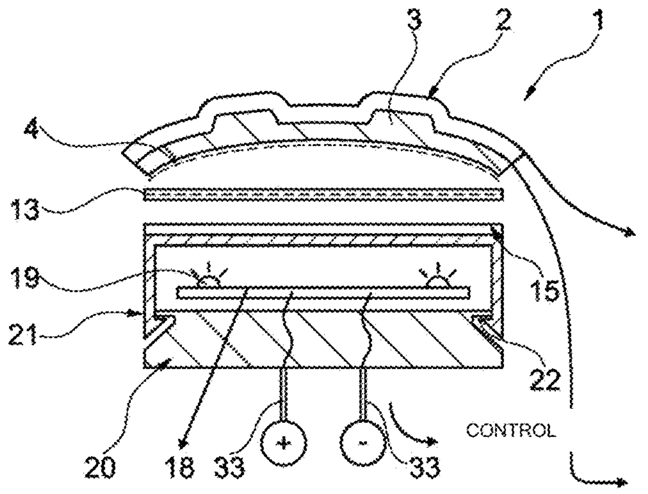
FIG. 1 shows a schematic sectional view through a first specific embodiment of a backlit vehicle badge.

In the sectional view according to FIG. 1, the backlit badge 1 is coated on the top side thereof with a top coat 2, which covers the three-dimensionally deformed film-like visible part 3. The visible part 3 can take on various specific embodiments, as will be described in more detail based on FIGS. 3 and 4. A print layer 4, which can have various colors, is applied to the rear side of the visible part 3.

The rear side of the print layer 4 is formed by an adhesion promoter 13, which rests across the entire surface or part of the surface of the rear side of the print layer 4.

Figure 2:
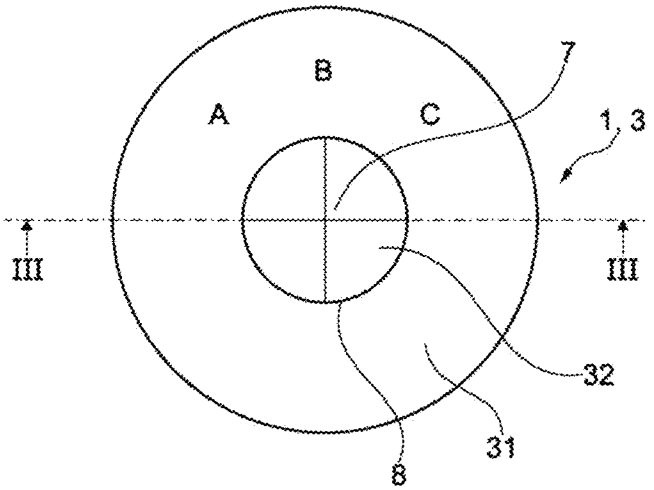
FIG. 2 shows a top view onto the visible side of the assembly according to FIG. 1.

Such a film-like thin visible part 3 emulates, for example, a Mercedes star or a colored BMW badge having a chrome trim part effect and colored surfaces and is designed as a rotation-symmetrical part in the exemplary embodiment according to FIG. 2.

Figure 3:
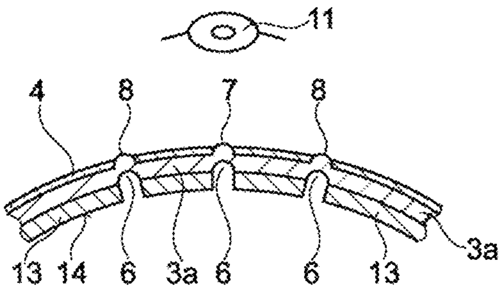
FIG. 3 shows a sectional view through a first specific embodiment of the three-dimensionally deformed film-like visible part.
Figure 4:
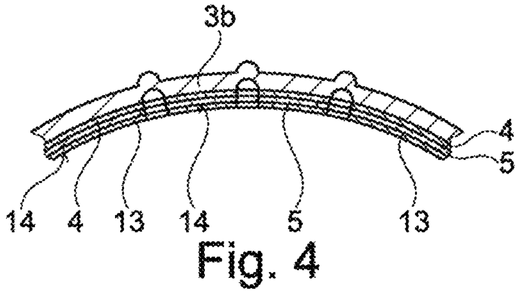
FIG. 4 shows a sectional view through a second specific embodiment of the three-dimensionally deformed visible part.

In the specific embodiments shown here, a special light impression is achieved in that the embossings 6 shown in FIGS. 3 and 4, which correspond to the vehicle logo or another graphical symbol and which are introduced on the rear side of the visible part 3, preferably in the form of embossings, achieve a special light effect.

The embossings 6 emulate, for example, the vehicle logo or another geometrical shaped element. They can preferably be rings or characters or the like. These embossings 6 are characterized in that, when illuminated with light beams 10 from the rear side, these regions 6, 7, 8 are transparent and allow the light to pass freely so that these regions, in particular due to the transparency thereof, yield a brilliant light impression. In addition, there are the regions covered by the print layer 4, which can be designed to be semi-transparent or transparent or not transparent or single-colored or multi-colored. These regions can also generate a desired, including colored, light impression on the visible side when backlit.

In this way, a color impression results in the outer ring 31, which is, for example, completely black and intransparent, for example in the top view onto the visible side of such a badge 1, wherein only the letters A, B, C are designed as embossings in the film-like visible part 3 and shine when backlit.

Sector-like decorative surfaces are then formed in the inner ring 32, which corresponds to a badge embossing 7, wherein, for example, the delimitation between the badge embossing 7 and the outer circumference of the inner ring 32 and the inner circumference of the outer ring 31 is designed as a ring embossing 8, so that this ring shines when backlit from the rear side.

Likewise, the sector-like surfaces in the inner ring 32 shine since these are covered by semi-transparent and colored print layers.

FIG. 3 shows a three-dimensionally deformed film-like visible part 3*a*, serving as a first specific embodiment, which on the top side thereof bears a print layer 4, which can be semi-transparent and/or not transparent and/or colored and/or not colored.

The print layer 4 preferably does not cover the embossings 7, 8 shown here, so that the embossings 7, 8 emit the radiant power of the light sources arranged in the light housing 15, 15*a* to the outside onto the visible side 11 with high efficiency.

Figure 5:
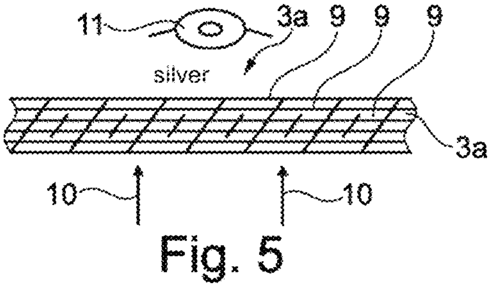
FIG. 5 shows an enlarged sectional view through a multi-layer filter film of a visible part.
Figure 6:
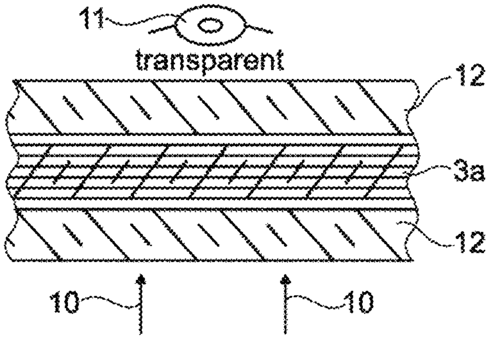
FIG. 6 shows a sectional view through a specific embodiment that is modified compared to FIG. 5, in which the same film according to FIG. 5 is coated with a carrier layer on the front and rear sides.

It is preferred when the inner side of the visible part 3*a*, which is designed as a colored film according to FIGS. 5 and 6, is also coated with an adhesion promoter 13, which is preferably only applied across parts of the surface, so that the regions formed by the embossings 6, 7, 8 are kept free of the adhesion promoter so as to allow light to pass through the embossings 6, 7, 8 unimpaired.

The adhesion promoter 13 is then used for the bonding, in one piece from a single material, with the light housing 15, 15*a* in the back-molding operation, which will be described below.

FIGS. 5 and 6 show the special configuration of the colored film 3*a*, from which it is apparent that the multi-layer film 3*a* functions as a filter film. Several nano-thick colored layers 9 are layered here one on top the other, and, when light passes through, have a filter effect so that the embossed and/or debossed regions of the film have a chrome-like (silver) appearance from the visible side when no light is passing through. When backlit, however, these regions become transparent and allow the light beams 10 from the light housing 15, 15*a* to pass through.

FIG. 6 shows as another exemplary embodiment that the multi-layer colored film 3*a* can also be coated on the top side and/or bottom side with a carrier layer 12 made of polycarbonate so as to enable ideal adhesion for the colored layers applied thereto and the adhesion promoter 13.

However, the invention is not limited to a multi-layer colored film 3*a* in which, due to a filter action of light beams passing through, the color impression changes on the visible side.

In a second embodiment, it may be provided according to FIG. 4 to use a transparent film 3*b* as the film-like visible part 3, which is only coated on the rear side thereof with a print layer 4, wherein the print layer 4 can be transparent and/or semi-transparent and/or colored.

It is also preferred here when the print layer 4 does not extend across the embossings 6, 7, 8 so as to enable light to pass through unimpaired from the bottom side.

It is furthermore preferred when additionally a PVD coating 5 is applied to the rear side of the print layer 4, which is preferably made of vapor-deposited or sputtered-on aluminum molecules. In this way, a silver color impression can be generated on the visible surfaces outside the embossings 6, 7, 8, which exactly matches an aluminum or chrome color impression so as to ensure a complete emulation of a badge 1 made of aluminum or chrome.

The PVD coating 5 according to FIG. 4 may only extend across the bottom side of the embossings 6, 7, 8 so as to generate a silver color impression in the region of these embossings. Likewise, however, the PVD coating 5 may also be dispensed with in this region of the embossings. In another embodiment, it may be provided that, instead of the PVD coating 5, the colored film 3*a* described based on FIGS. 3, 5 and 6 is inserted as an added part, which likewise generates the desired chrome trim part effect in the region of the embossings.

In all specific embodiments of the drawings, it may be provided that the inserted colored film 3*a* according to FIGS. 5 and 6 is additionally provided with light-guiding structures.

It is preferred according to the exemplary embodiment according to FIG. 4 when an adhesion promoter 13 is now applied to the rear side of the PVD coating or the colored film 3*a* used instead, with the adhesion promoter ensuring the necessary adhesive bond during the molding to the cover surface 16 of the light housing 15.

In the case of the inserted film 3*a*, the adhesion promoter 13 would also have to be applied to both sides, and FIG. 6 also shows, as another exemplary embodiment, that carrier layers 12 made of polycarbonate can be provided on the top side and bottom side of a colored film 3*a*.

Figure 7:
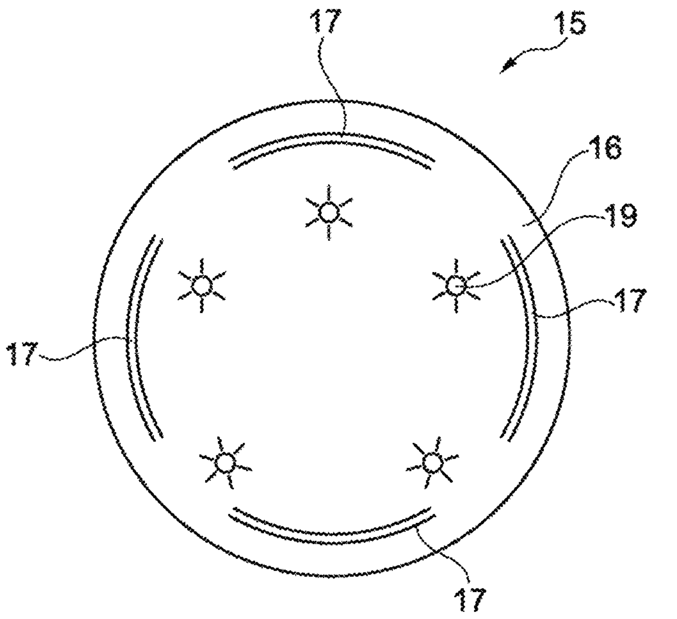
FIG. 7 shows a top view onto the light-emitting side of a light housing.

FIG. 7 shows the top view onto the cover surface 16 of the light housing 15, from which it is apparent that light-guiding structures 17 can also be arranged in the cover surface 16, which are then completely enclosed in the back-molding operation. Furthermore, it is also apparent through the translucent or transparent cover surface 16 that light-emitting structures, such as LEDs 16, are arranged in the interior.

Figure 8:
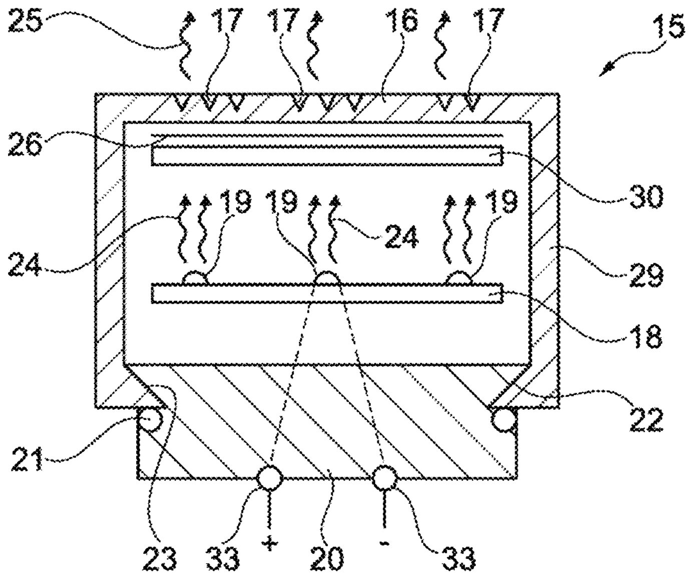
FIG. 8 shows a sectional view through a light housing according to FIG. 7.

FIG. 8 shows a sectional view through the assembly according to FIG. 7, from which it is apparent that the light housing 15, 15*a* in the cross-section has an approximately U-shaped profile, that is, it is a preferably pot-shaped or cylindrical housing that is open toward the bottom, which is preferably snapped onto the outer circumference of a housing bottom 20 in a sealed manner with the aid of detent feet 22 that are directed toward one another and an interposed annular seal 21.

Instead of the detent connection shown here, the light housing 15 open toward the bottom can also be connected by an adhesive joint, a screw joint or a weld joint to the housing bottom 20. The connections 33 for a power supply are routed through the housing bottom 20, which lead to the circuit board 18 equipped with electronics, on which further electronic components, which are not shown, can be arranged.

The LEDs 19 arranged in this way on the circuit board 18 thus emit light beams 10 toward the top in the direction of the arrow 24, which additionally can be distributed by a diffusing lens 30 arranged thereabove and also additionally by a diffusing foil 26 arranged thereabove.

The aforementioned light-guiding structures 17 can also be arranged in the cover surface 16; they can be designed as debossings, embossings, slots or notches or as punctiform depressions (dots).

It is also possible for dot matrices to be provided so that the light beams 25 reach the bottom side of the film-like visible part 3.

It shall also be mentioned that the detent connection with the detent feet 22 of the light housing 15 cooperates with a detent groove 23 in the housing bottom 20.

In another exemplary embodiment of the invention, it may be provided that, instead of the light-emitting structures including the LEDs 19 according to FIG. 8, one or more light guides 27 are routed through the housing bottom 20 and lead into the interior of the light housing with in a light-emitting manner with light distributors 28 which emit light beams 24 toward the top, which can additionally be distributed by a diffusing lens 30 and by one or more diffusing foils 26.

Figure 9:
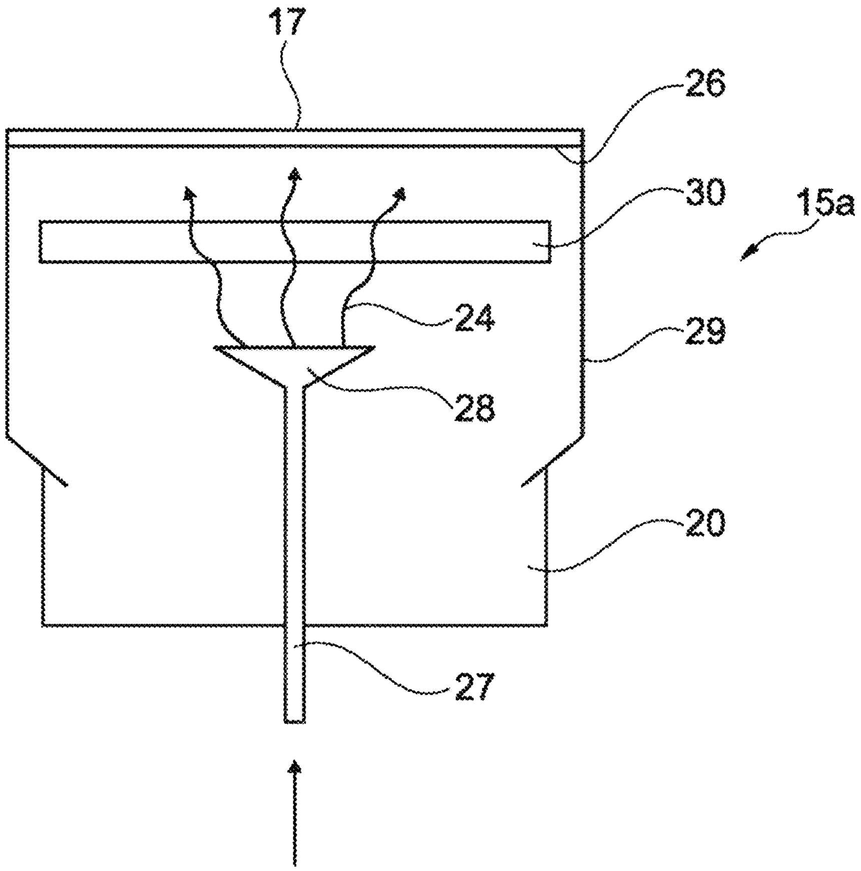
FIG. 9 shows a schematic sectional view through a modification of a light housing illuminated by way of a light guide bundle.

In the exemplary embodiments of FIGS. 8 and 9, the light guide housing 15, 15 A has a two-piece design and is thus composed of the top part 29 and the housing bottom 20.

In other embodiments, however, a one-piece design or connection can be provided between the light housing 15, 15 A and the housing bottom 20.

The technical teaching of the invention therefore makes it possible for the first time to produce a backlit vehicle badge or plastic trim part using plastics technology, which achieves a particularly stable, warp-free structure with a brilliant color scheme, and a chrome trim part effect.

It shall also be added that the adhesion promoter 13 shown in FIG. 1 is applied to the initially undeformed film-like visible part 3, and only then is the film-like visible part 3 provided with embossings and optionally debossings.

This has the advantage that all the layers can applied to the initially undeformed film-like visible part 3, including the print layers and the adhesion promoter, and only then is the visible part 3, namely the colored film 3A or transparent film 3B, three-dimensionally deformed. The deformation of this part is preferably carried out according to the AccuForm process by Hytech. However, it is also possible for another heat-induced deformation to be carried out, such as, for example, in a thermoforming process or a Niebling process.

In another embodiment, the adhesion promoter can also be applied after the deformation process.

DRAWING LEGEND

1 Badge
2 Top coat
3 film-like visible part
3*a* Colored film
3*b* Transparent film
4 Print layer
5 PVD coating
6 Embossing
7 Badge Embossing
8 Ring Embossing
9 Colored layer (of 3*a*)
10 Light beam
11 Visible side
12 Carrier layer (for example Polycarbonate)
13 Adhesion promoter
14 Adhesive surface
15 Light housing
15*a* Light housing
16 Cover surface
17 Light-guiding structure
18 Circuit board with electronics
19 LED
20 Housing bottom
21 Annular seal
22 Detent foot
23 Detent groove
24 Direction of arrow
25 Light beam
26 Diffusing foil
27 Light guide
28 Light distributor
29 Top part (of 15, 15*a*)
30 Diffusing lens
31 Ring (outside)
32 Ring (inside)
33 Connections

The invention claimed is:

1. A backlit vehicle trim part, in particular a vehicle badge, comprising:

a three-dimensionally shaped film-like visible part made of plastic, the three-dimensionally shaped film-like visible part having a visible side forming an externally visible surface of the vehicle trim part or vehicle badge and a rear side opposite the visible side, and a plastic light housing, the plastic light housing being arranged on the rear side of the three-dimensionally shaped film-like visible part, defining a light chamber behind the three-dimensionally shaped film-like visible part, containing at least one light element arranged in the light chamber, and being joined to the three-dimensionally shaped film-like visible part, wherein the three-dimensionally shaped film-like visible part is a closed, non-perforated plastic film which is three-dimensionally pre-shaped before being joined to the light housing, wherein the light housing is directly integrally molded onto the rear side of the three-dimensionally shaped film-like visible part by an in-mold back-molding operation applied to the three-dimensionally pre-shaped film, wherein three-dimensional deformations, in the form of convex embossings, are integrally formed in regions of the three-dimensionally shaped film-like visible part, wherein the convex embossings, in the regions of the three-dimensionally shaped film-like visible part, generate a chrome trim part effect when back-lighting is absent and become transparent or translucent when backlit so as to allow light from the light housing to pass through the closed, non-perforated plastic film to the visible side, wherein a print layer and an adhesion promoter are arranged on the rear side of the three-dimensionally shaped film-like visible part, wherein, on the rear side of the three-dimensionally shaped film-like visible part, the convex embossings are not covered by the print layer and are free of the adhesion promoter so that light from the light housing passes through the convex embossings without being impaired by the print layer or the adhesion promoter, and wherein light emitted by the at least one light element passes from the light chamber through the closed, non-perforated plastic film in the region of the convex embossings without passing through through-openings in the three-dimensionally shaped film-like visible part.

2. The vehicle trim part according to claim 1, wherein the plastic light housing has a U-shaped profile in cross-section and a cylindrical or pot-shaped design.

3. The vehicle trim part according to claim 2, wherein light-guiding structures are arranged in the cover surface of the plastic light housing.

4. The vehicle trim part according to claim 1, wherein the three-dimensionally shaped film-like visible part has a thickness in the range of 0.3 to 0.6 mm.

5. The vehicle trim part according to claim 1, wherein the adhesion promotor forms adhesive surfaces outside the region of the convex embossings.

6. The vehicle trim part according to claim 1, wherein the convex embossings form a vehicle logo, a ring, a character, or another graphical symbol.

7. The vehicle trim part according to claim 6, wherein the three-dimensionally shaped film-like visible part comprises a multi-layer colored film that is at least partially translucent in the region of the convex embossings.

8. The vehicle trim part according to claim 6, wherein a PVD coating comprising aluminum is arranged on the rear side of the print layer to generate the chrome trim part effect.

9. The vehicle trim part according to claim 1, wherein the plastic light housing is open toward a bottom side and is joined to a housing bottom by a detent connection, a screw connection, a weld connection, or an adhesive connection.

10. A method for producing the vehicle trim part according to claim 1, comprising inserting the three-dimensionally pre-shaped plastic film into an injection mold and injection-molding the plastic light housing onto the rear side of three-dimensionally pre-shaped plastic film by the in-mold back-molding operation.

* * * * *